United States Patent
Klosa et al.

(10) Patent No.: US 7,631,187 B2
(45) Date of Patent: Dec. 8, 2009

(54) METHOD FOR THE INITIALISATION OF MOBILE DATA SUPPORTS

(75) Inventors: Klaus Ulrich Klosa, Grüningen (CH); Roman Eppenberger, Dürnten (CH)

(73) Assignee: Kaba Schliesssysteme AG, Wetzikon (CH)

( * ) Notice: Subject to any disclaimer, the term of this patent is extended or adjusted under 35 U.S.C. 154(b) by 419 days.

(21) Appl. No.: 10/070,786

(22) PCT Filed: Jul. 10, 2001

(86) PCT No.: PCT/CH01/00433

§ 371 (c)(1), (2), (4) Date: Jul. 16, 2002

(87) PCT Pub. No.: WO02/05225

PCT Pub. Date: Jan. 17, 2002

(65) Prior Publication Data

US 2003/0033527 A1    Feb. 13, 2003

(30) Foreign Application Priority Data

Jul. 11, 2000    (CH) .................................... 1365/00

(51) Int. Cl.
*H04L 9/00* (2006.01)
*G06F 7/04* (2006.01)
*G06F 7/58* (2006.01)
*G06F 7/10* (2006.01)
*G06K 19/073* (2006.01)
*G06F 3/08* (2006.01)
*G06F 7/08* (2006.01)

(52) U.S. Cl. .............................. 713/172; 726/4; 726/18; 726/21

(58) Field of Classification Search .................. 726/4, 726/18, 21; 713/172
See application file for complete search history.

(56) References Cited

U.S. PATENT DOCUMENTS 5,043,562 A * 8/1991 Hautvast et al. ............. 235/440
5,473,689 A * 12/1995 Eberhard .................... 713/169
5,502,765 A    3/1996 Ishiguro et al.

(Continued)

FOREIGN PATENT DOCUMENTS

DE    197 20 431 A1    5/1997
DE    102006008248 A1 *   8/2007
EP      0 949 595 A2    3/1999

(Continued)

OTHER PUBLICATIONS

Xuming Lu, Guangbin Fan, Ruibing Hao, "A Dynamic Token Passing MAC protocol for Mobile Ad Hoc Networks", Jul. 2006, IWCMC '06: ACM Proceedings of the 2006 international conference on Wireless communications and mobile computing, pp. 743-748.*

*Primary Examiner*—Matthew B Smithers
*Assistant Examiner*—Courtney D Fields
(74) *Attorney, Agent, or Firm*—Oppedahl Patent Law Firm LLC

(57) ABSTRACT

With the method, mobile data carriers (IM) are initialized at assigned decentralized read and write stations (WR) within the framework of an authorization system (A). At an authorization authority (HA) in a secure environment (g) initialization data (DI, A-I, I-I) are generated by authorization means (AM) and are sent to a decentralized authorized read and write station (A-WR) over a network (N) in a secure communication and with security rules in correspondence with the authorization system (A), where the mobile data carriers (IM) are initialized with the initialization data (DI), and/or wherein the initialization data are sent to a decentralized read and write station (WR) over the network, by means of which the read and write station is initialized. This initialization method enables new possibilities for the application and exploitation of systems of this kind.

23 Claims, 7 Drawing Sheets

U.S. PATENT DOCUMENTS

Figure 1:
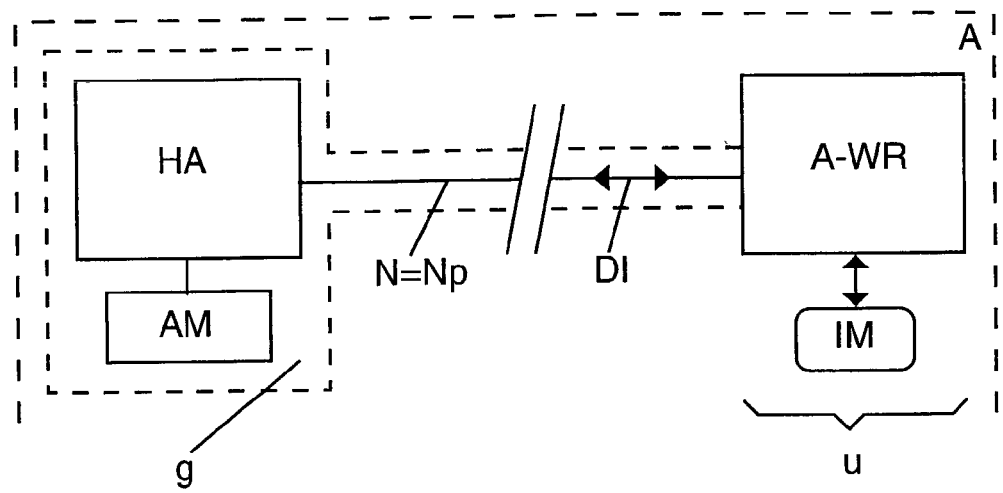

| | | |
|---|---|---|
| 5,534,857 A | 7/1996 | Laing et al. |
| 5,778,067 A | 7/1998 | Jones et al. |
| 5,825,875 A | 10/1998 | Ugon |
| 6,014,088 A * | 1/2000 | Van Santbrink et al. .... 340/10.3 |
| 6,014,748 A | 1/2000 | Tushie et al. |
| 6,871,278 B1 * | 3/2005 | Sciupac ...................... 713/185 |
| 7,064,552 B2 * | 6/2006 | Cuylen ....................... 324/428 |
| 7,248,886 B1 * | 7/2007 | Ljungstroem et al. ....... 455/465 |

FOREIGN PATENT DOCUMENTS

| | | |
|---|---|---|
| FR | 2 536 928 | 11/1982 |
| WO | WO 98/09257 | 3/1998 |
| WO | WO 98/43212 | 10/1998 |
| WO | WO 98/52160 | 11/1998 |
| WO | WO 98/52163 | 11/1998 |

* cited by examiner

METHOD FOR THE INITIALISATION OF MOBILE DATA SUPPORTS

The invention is related to a method for the initialisation of mobile data carriers with assigned decentralised read and write stations within the framework of an authorisation system in accordance with the generic term of claim 1. Mobile data carriers (e.g., identification media with or without contact, chip-cards or value cards, etc.) make it possible at assigned read and write stations for the user to carry out corresponding applications, such as the access to services (PC-access) and goods (beverage vending machine, restaurant), resp., the access to protected areas, buildings, sports stadiums, etc. In order to make possible these accesses, resp., the carrying-out of applications, the initialisation of the data carriers and of the assigned read and write stations within the framework of an authorisation system with corresponding initialisation information is necessary.

This initialisation can relate to application-specific data (e.g., the registration of a monetary value on the data carrier) and to system-specific data (e.g., the number of the card issuer, data organisation in the case of multiple applications, access rules for data carriers, etc.). These initialisation data, resp., applications can also be initialised and changed too time by time, step by step and at differing points in time.

This initialisation is a process critical for the security and also a very elaborate one, which is also geographically very restricted and which can only take place in locations within a secure environment. An example for this is described in WO 97/34265. It describes a system with contact-less passive electronic data carriers as identification media IM with assigned read and write stations WR within the framework of an authorisation system A, wherein data carriers can contain several independent applications. Here every identification medium and every application has to be initialised in accordance with the rules of the hierarchic authorisation system. For this initialisation of the data carriers, special programming read and write stations as well as special authorisation media in a secure environment are necessary and all decentralised read and write stations can also be baptised, resp., initialised with a special means of authorisation, in order to be able to take up their functions.

A decentralised initialisation of data carriers IM at these decentralised read and write stations mostly in an unsecured environment is not possible here. The initialisations for this reason is very elaborate and limited and the initialisation and administration of the authorisation media is also critical with respect to security and elaborate and costly.

These known central initialisations of each individual data carrier with special authorisation means in a secure environment for this reason are very elaborate and expensive, not very flexible and very restricted. With them, in an unsecured environment it is not possible to initialise and to put into operation new applications and new data carriers.

If, for example a mountain restaurant in a ski-ing area, within which for different applications contact-less identification media are issued as ski passes, would like to add an extension of the application for its application and for its customers, for example a loyalty application, then for this purpose each individual data carrier, i.e., every ski-pass, has to be initialised in a secure environment with an initialisation device and with a corresponding initialisation medium, i.e., not in the mountain restaurant, but down in the valley at a central station in this ski-ing area. This procedure of course is not practicable in such a case.

A completely different kind of data transmission through a network is known in the case of contact card systems, where the whole organisation and all authorisations have to come from a single system centre. Thus from DE 197 20 431, e.g., a process for the electronic personalisation and initialisation of chip-cards from a central chip-card administration system is known. These initialisations are effected through a communication channel to a chip-card control system, resp. to a reading device, which physically makes contact with the chip-card and transfers the data directly to the chip-card. Also with systems of this kind the problem outlined below cannot be solved.

It is therefore the objective of the invention presented here to create a method, resp., a system, which overcomes these limitations applicable up to now with respect to the initialisation of data carriers and decentralised read and write stations, the extension of applications and the issuing of new data carriers, which forms a significantly simpler, more versatile and secure initialisation method and with this also creates new application possibilities, and which in particular also makes it possible to make use of contact-less data carriers.

This problem is solved in accordance with the invention by a method for the initialisation of mobile data carriers according to claim 1. By means of the initialisation through a network with secure communication and with authorisations by means of authorisation means at remote authorisation authorities in a secure environment, the mentioned further application—and exploitation possibilities of system like this with mobile data carriers and decentralised read and write stations are quite decisively expanded.

The dependent claims are concerned with further developments of the invention with an expansion of the possibilities in a geographical respect, with respect to applications and the introduction of new data carriers and with respect to new kinds of exploitation, application and use. Decisive is the fact, that with it in principle also all decentralised read and write stations in an unsecured environment are utilisable for initialisations, inasmuch as the security is warranted by the secure communication through the network and by the linking with the remote authorisations authority with authorisation means in a secure environment. This makes quite new types of application possible, for example, a recording and controlling of licence payments through decentralised read and write stations. The additional interrogation of personal data of the owner of the data carrier or of the owner of the read and write station is also capable of further enhancing the security of decentralised authorisations.

Figure 2:
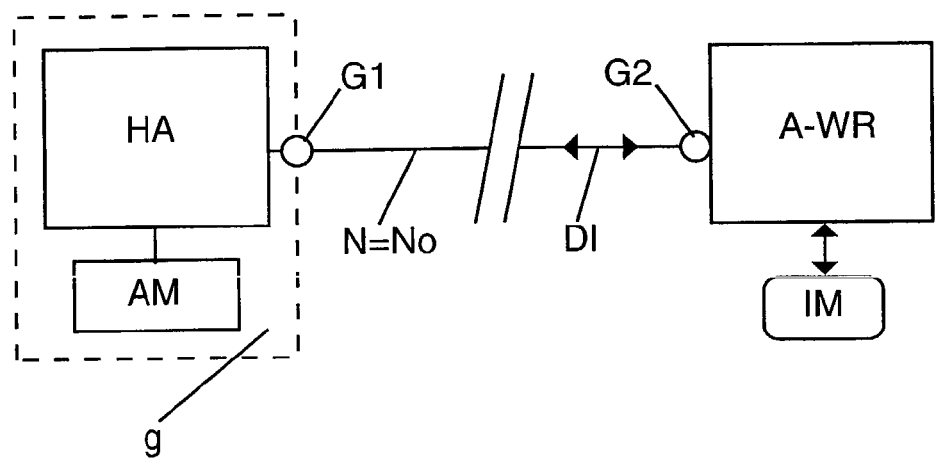
Figure 3:
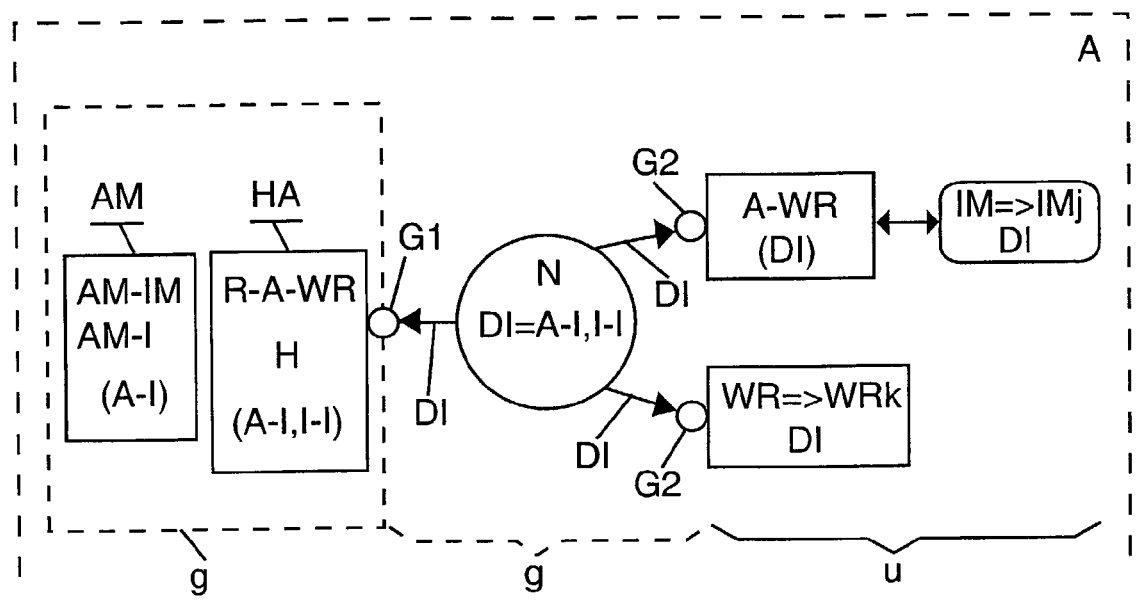
Figure 4:
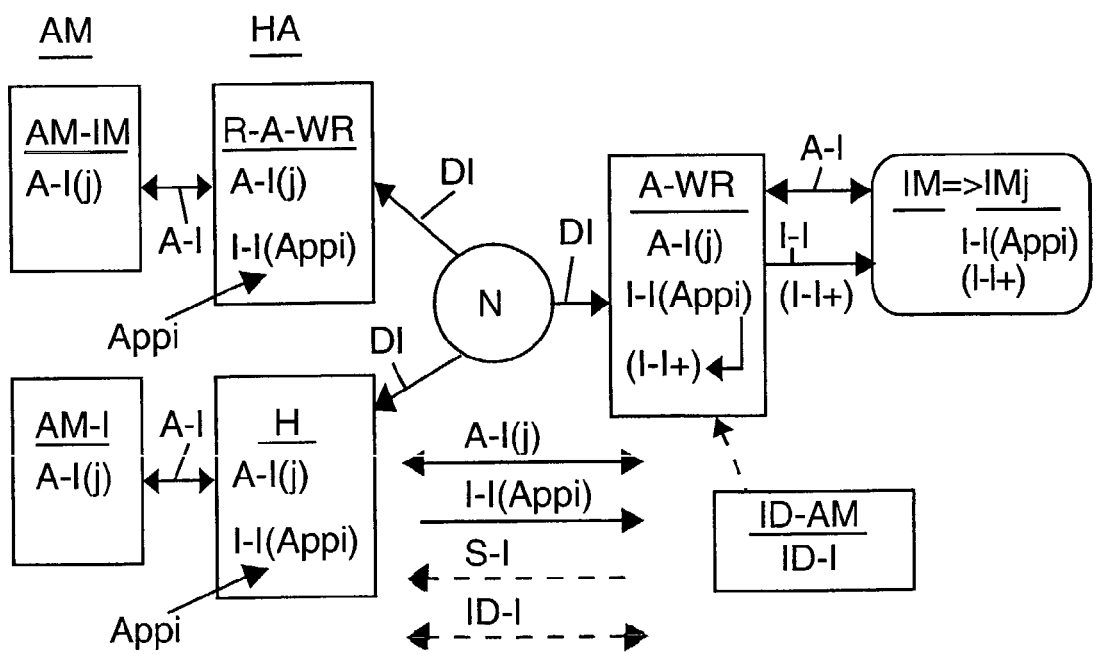
Figure 5:
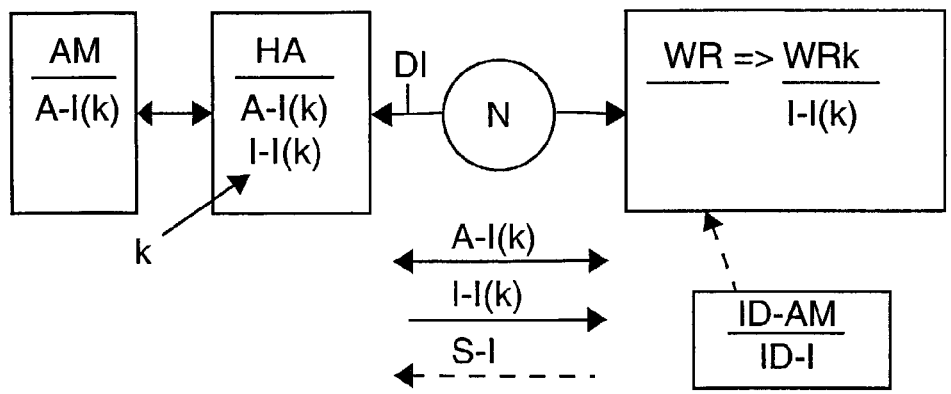
Figure 6:
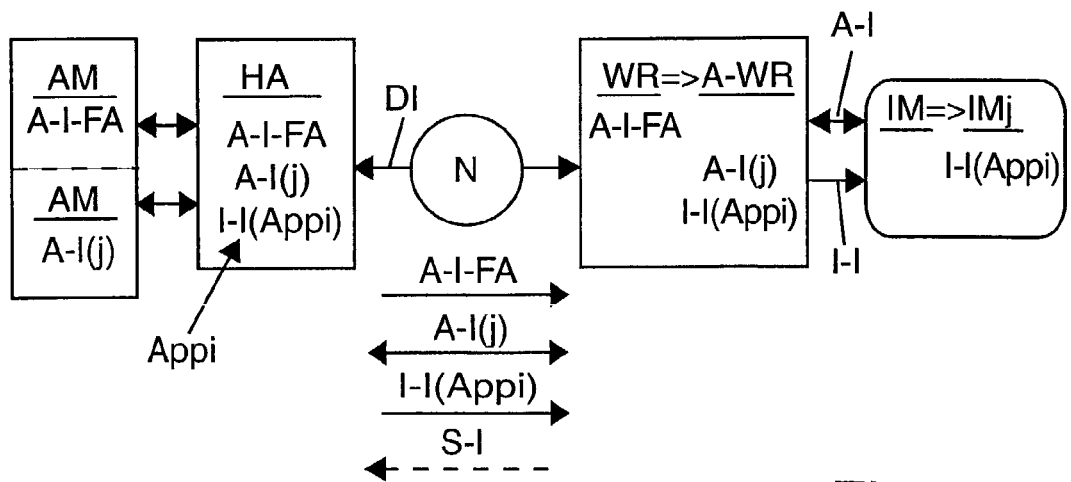
Figure 7:
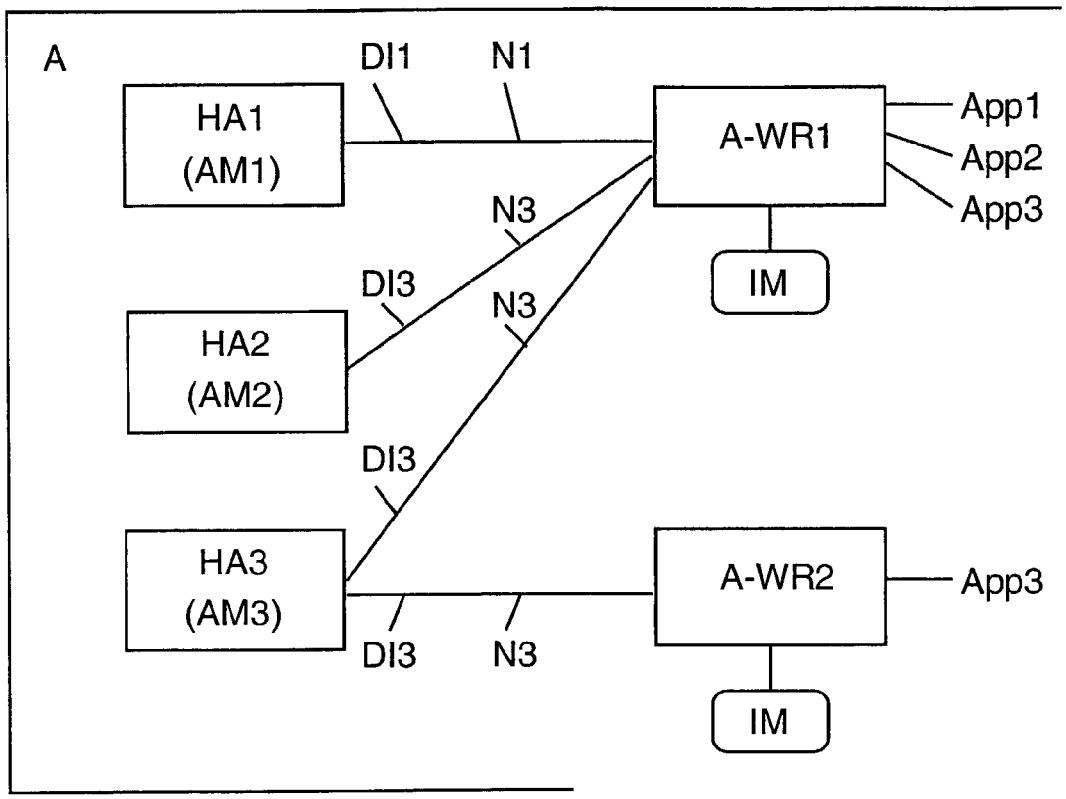
Figure 8:
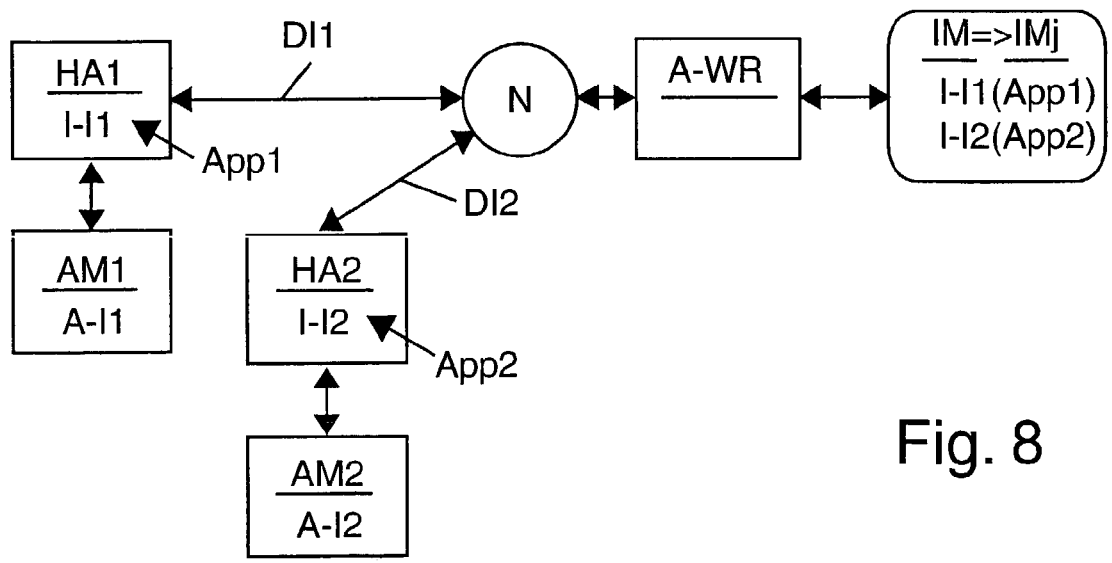
Figure 9:
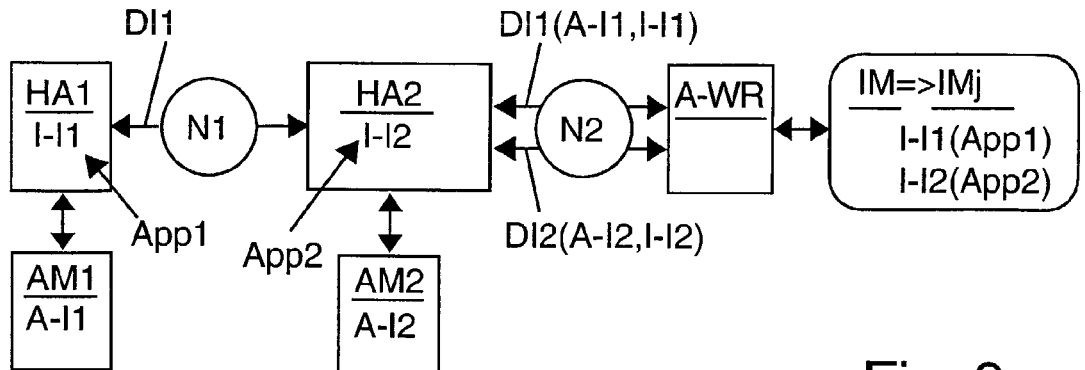
Figure 10:
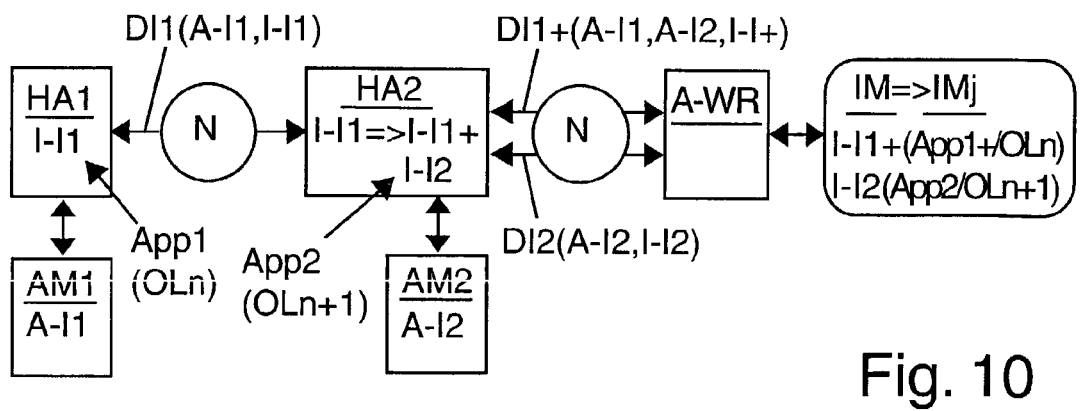
Figure 11:
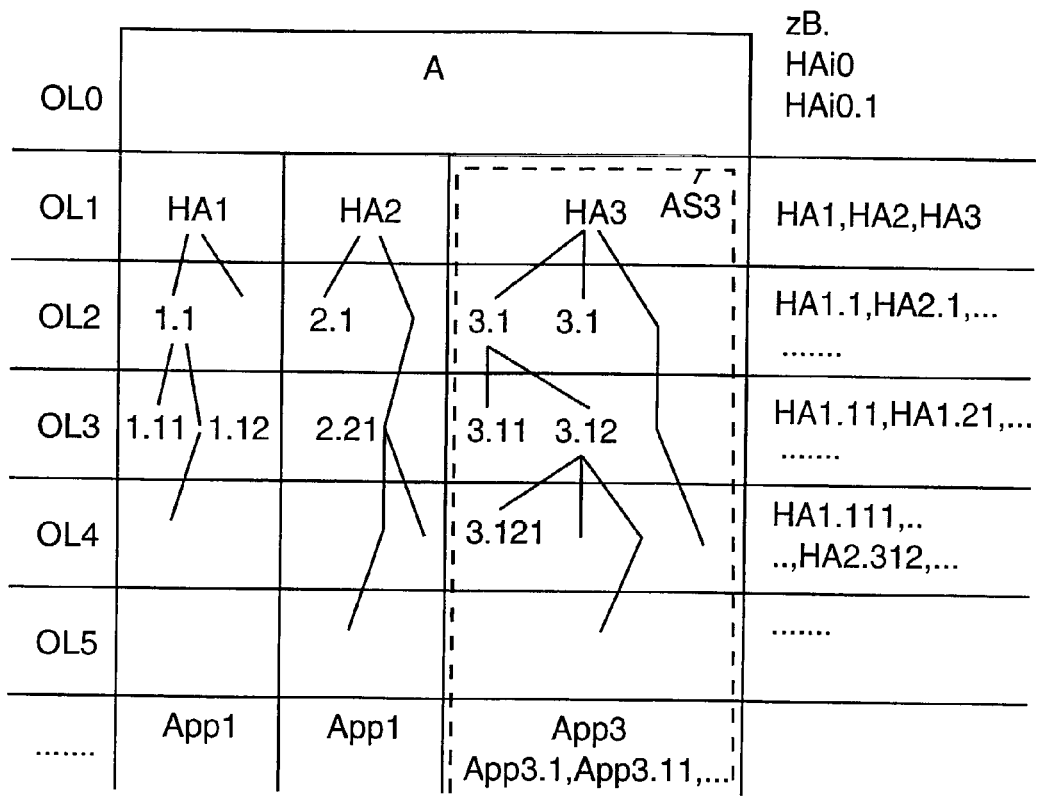
Figure 12:
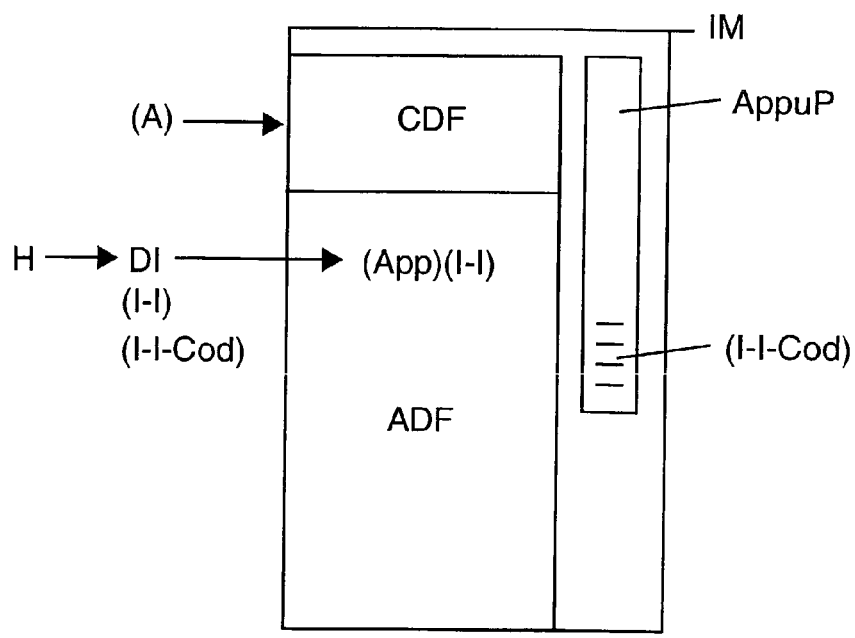
Figure 13:
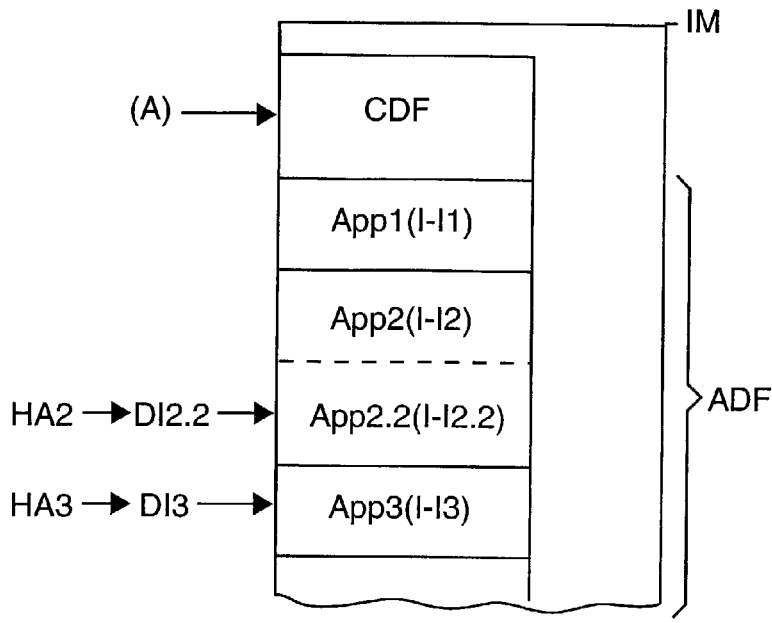
Figure 14:
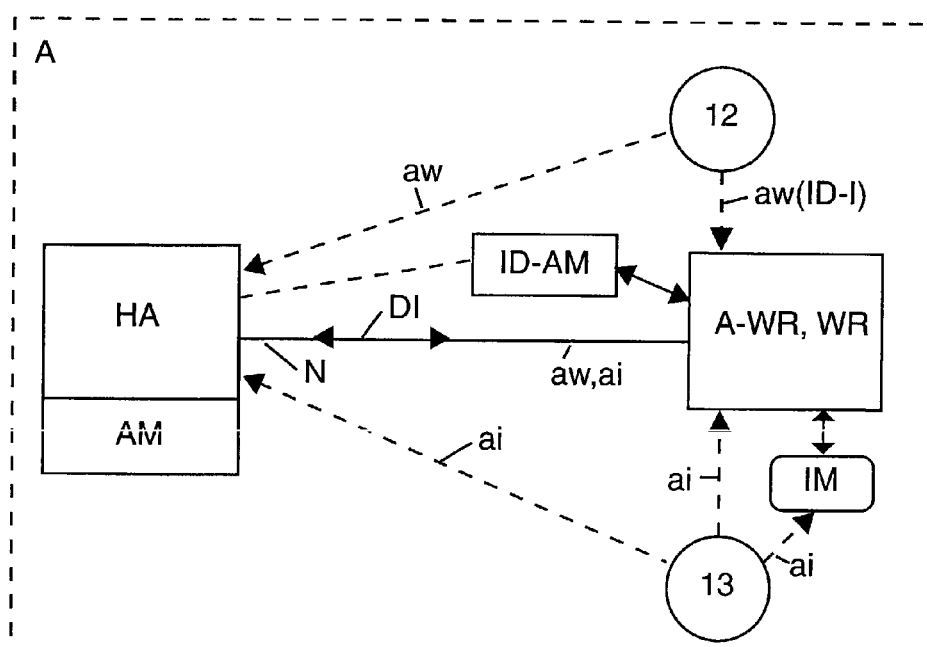

In the following, the invention is explained in more detail on the basis of Figures and examples. These illustrate:

FIG. 1 a schematic diagram of a method in accordance with the invention for the initialisation of data carriers through a private network, FIG. 2 a method for the initialisation of data carriers through an open public network, FIG. 3 the method according to the invention for the initialisation of data carriers and of decentralised read and write station through a network by authorisation at an authorisation authority with authorisation means, FIG. 4 The initialisation of a mobile data carrier with authorisation—and initialisation information, FIG. 5 an initialisation of a decentralised read and write station with authorisation—and initialisation information, FIG. 6 the initialisation of an authorisation function at a decentralised read and write station, FIG. 7 initialisations of applications through networks by several authorisation authorities, FIG. 8 initialisations by several authorisation authorities through a network, FIG. 9 initialisations by several authorisation authorities through several network levels, FIG. 10 initialisations by several authorisation authorities through several network levels with several authorisation levels, FIG. 11 schematically the organisation in an authorisation system with several authorisation, resp., organisation levels, several authorisation authorities on different authorisation levels and with several independent users, FIG. 12 the initialisation of applications in a new data carrier, FIG. 13 the initialisation of additional applications in a data carrier, FIG. 14 authorisations for the initialisation of data carriers through a network.

FIGS. 1-3 illustrate the method according to the invention for the initialisation of mobile data carriers IM at assigned decentralised read and write stations WR within the framework of an authorisation system A, which defines hierarchic rules applicable for the complete system of read and write stations, data carriers, authorisation authorities and authorisation means, such as is described. for example on the basis of a system with contact-less identification media in WO 97/34265. This known system, however, solely serves as a possible example of an application of the invention.

The method in accordance with the invention is illustrated in FIG. 3: The initialisation of mobile data carriers IM with assigned decentralised read and write stations A-WR and/or by decentralised read and write stations WR is implemented within the framework of a hierarchic authorisation system A applicable for all system elements through an authorisation with authorisation means AM at an authorisation authority HA in a secure environment g, where initialisation data DI=A-I, I-I are generated and transmitted to a decentralised authorised read and write station A-WR or to a decentralised read and write station WR through a network N in a secure communication and with security rules corresponding to the authorisation system. The initialisation data DI in doing so contain authorisation information A-I, which is input into the authorisation authority by the authorisation means AM and initialisation information I-I, which is also input into the authorisation authority HA or called in from it.

At the decentralised read and write station A-WR, the mobile data carriers IM are correspondingly initialised with the initialisation data DI and with this transformed into initialised data carriers IMj, or with the initialisation data DI the decentralised read and write station WR is initialised and transformed into an initialised read and write station WRk.

FIGS. 1 und 2 illustrate the secure communication through a network N up to the decentralised read and write stations A-WR in an unsecured environment u.

In the example of FIG. 1, in doing so the initialisation is implemented through a secure private network Np, with which the secure environment is assured right up to the read and write stations.

FIG. 2 illustrates an example of the initialisation according to the invention through an open network No with an encryption and security gates G1 and G2 on both sides, in order to assure the necessary secure communication through the open public network.

By means of the secure connection through the network N, the decentralised read and write stations WR, resp. A-WR, which normally are situated in an unsecured environment, are tied into the secure environment of the authorisation authority HA for the initialisations and with this the initialisation takes place in a secure environment. After the initialisation has been carried out, the execution of applications can take place as up until now with the identification media IM at the read and write stations WR in an unsecured environment. The secure environment g through the network therefore only has to be temporarily created for the initialisation.

With the FIGS. 4-6, different initialisation processes are illustrated in more detail. In FIG. 4, first of all possible embodiments of authorisation authorities HA and AM are illustrated.

In contrast to known contact card systems, e.g., in accordance with DE 197 20 431 with a single central authorisation—and organisation station (system centre), from which all initialisations have to be carried out and administered, in the system according to the invention no such centre of the authorisation system A is necessary. The authorisation system a is rather more defined by the adherence to hierarchic authorisation rules, wherein these authorisation rules are implanted or stored in memory in various geographically distributed authorisation authorities HAi, e.g., on a chip or as a program. These authorisation rules, resp., the authorisation means AM in principle form a geographically distributed "virtual authorisation system center" A. The affiliation to the system A for all read and write station and all identification media is assured by a basic system preparation or basic initialisation.

For the initialisation of a new application Appi with the initialisation information I-I(Appi), an authorisation corresponding to the organisation level with the authorisation information A-I is necessary. With the authorisation means AM, this authorisation information A-I corresponding to the authorisation system A is transmitted to the authorisation authority HA.

In this, the authorisation authorities HA in accordance with FIG. 4, e.g., can consist of a host computer H with the corresponding authorisation rules of the system A or also of a remote authorisation read and write station R-A-WR. The authorisation means AM, for example, can comprise an authorisation identification medium AM-IM, which contains the authorisation information A-I or of authorisation data AM-I, which, e.g., as a software (program) are able to be polled in a host H, resp., executed. In the case of a physical authorisation medium AM-IM, the handling corresponding to the security requirements is carried out by the holder (owner) of the authorisation medium. In the case of software programs AM-I in a host H, the security is assured by an identification of the user, e.g., by means of a PIN code or biometric data or through an assigned special identification medium (ID-AM).

In FIG. 4, the initialisation of a data carrier IM is illustrated. In this, the authorisation information A-I(j) relates to the authorisation for the initialisation j of a data carrier IM. The initialisation information I-I(Appi) for a new application Appi is input into, generated in or called in by the authorisation authority HA and initialised in the data carrier as described through the network and the decentralised read and write stations A-WR: IMj (with Appi).

FIG. 5 illustrates the initialisation k of a read and write station WR. The authorisation information is input into, created by or called in by the authorisation authority HA by the authorisation means AM. The initialisation information I-I(k) is also entered into the authorisation authority. For the initialisation of the read and write station WR, i.e., for the transformation into a WRk through a network, first the authorisation information A-I(k) is transmitted from the authorisation authority HA to the read and write station WR, whereupon subsequently the transmission of the initialisation information I-I(k) is implemented. In analogy to the initialisation of new applications on a data carrier, an initialisation of the read and write station WR can also be carried out by corresponding initialisation data I-I(k), with which, for example, additional functions can be introduced into the read and write station.

FIG. 6 illustrates the transformation, resp., initialisation of a decentralised read and write station WR into an authorised read and write station A-WR, in order to thereupon be able to carry out initialisations of mobile data carriers IM with it. To achieve this, the read and write station WR must be initialised with the authorisation function FA beforehand. First the authorisation information A-I-FA has to be input into the authorisation authority HA by an authorisation means AM, whereupon the initialisation, resp., the transformation of the decentralised read and write station WR into an authorised read and write station A-WR with authorisation function FA is carried out. Subsequently the initialisation of applications can be implemented as up until now (FIG. 4) by the authorisation information A-I(j) for a certain application Appi and the corresponding initialisation information I-I(Appi) through the network and the decentralised, authorised read and write station A-WR in the mobile data carrier IM: IMj with I-I(Appi).

This authorisation function FA does not have to be permanently activated, it can also be cancelled again, resp., interrupted with the network link or after a certain time period or after a certain number of initialisations, as a result of which the authorised read and write station A-WR is transformed back into an ordinary, decentralised read and write station WR.

In FIGS. 4-6 further possible functions are illustrated, which are capable of being initialised, resp., carried out through the network N.

Status information S-I concerning events at the authorised, resp., at the decentralised read and write stations A-WR, WR and/or at the mobile data carriers IM are able to be notified to corresponding authorisation authorities through the network and there, for example, to be utilised for invoicing or for the settlement of fees for usage and licences. Examples for this will be explained later.

As a further option for the authorisation of a legitimate user for an initialisation with an identification authorisation means ID-AM, it is possible to verify his or her identification ID-I (FIG. 4, 5, 14).

Absolutely essential is the secure communication of the initialisation data DI through the network, so that the security of the complete system with the mobile data carriers is not impaired by the data transmission through the network.

In the case of a communication through private networks Np, e.g., through proprietary company networks, this required security is given.

In the case of a transmission of the initialisation data through public networks No, for this purpose a secure communication with as such known means (encryption and further security factors) has to be assured. This is also applicable for a communication through a combination of public and private networks. With this, in principle any networks are capable of being utilised for the transmission of the initialisation data (such as LAN, WAN, Internet, Intranet und Extranet, etc.).

The initialisation in accordance with the invention can also take place through a virtual private network, i.e., a private data network, which makes use of public telecommunications networks, e.g., as company network, wherein encryption and tunnelling mechanisms ensure, that only authorised users obtain access, e.g., through the Internet IP (Internet protocol), VPM (Virtual Private Networks).

Essential is the fact, that the degree of security of this communication is assured in correspondence with the importance of the initialisation, resp., of the initialisation data.

This both with respect to the communication through the network, in principle the external security with respect to the network, as well as with respect to the internal security in the authorisation system, which differentiates between different hierarchic levels OLi in correspondence with the hierarchic definition and the importance of the applications. Overall, a security corresponding to the importance of the applications, resp., of the initialisations has to be assured both as external as well as as internal security, wherein of course the external security with respect to the network must not be lesser than the required internal security.

Differing levels of importance, resp., authorisation, for example may be:

The loading of an additional application, such as a loyalty bonus, onto a customer card of a supermarket only calls for a relatively low security level, because the potential damage resulting from unauthorised actions is slight. On the other hand, e.g., the access authorisation for utilisation levels of the highest secrecy in an EDP data system or the initialisation of completely new data carriers and above all the booking of monetary amounts call for a high security level.

FIG. 7 now illustrates an example with several authorisation authorities HA1, HA2, HA3 each respectively with the corresponding authorisation means AM1, AM2, AM3, within the framework of the authorisation system A, which transmit their own, independent applications App1, App2, App3 with their initialisation data DI1, DI2, DI3 through networks N1, N2, N3 to corresponding assigned authorised read and write stations A-WR, at which the mobile data carriers IM are respectively initialised. In this, the networks may differ, e.g., N1 an open public network and N2 a private network, or two or more authorisation authorities may utilise the same network, with their own security rules, however. Naturally the read and write stations have to correspond to the authorisation authority, i.e., in this example the reading station A-WR2 is only accessible to the authorisation authority HA3, i.e., assigned to it with corresponding applications App3, while the read and write station A-WR1 in this example is assigned to and accessible for all three authorisation authorities HA1, HA2, HA3 with their respective applications App1, App2, App3. The analogue is applicable for the assignment of the mobile data carriers IM, which are also assigned to one or more authorisation authorities with the corresponding possibility of initialisation of their applications.

FIGS. 8-11 illustrate further examples of initialisations through several networks, resp., through several network levels (also within the same network) with several authorisation authorities HA and authorisation means AM as well as with several, resp., different authorisation levels OLi.

FIG. 8 illustrates an example with several authorisation authorities HA1, HA2 with authorisation means AM1, AM2 and with different applications App1, App2. The corresponding initialisation data DI1, DI2 are transmitted to the decentralised authorised read and write stations A-WR through the same network in one level for the initialisation of the two applications App1, App2 in the data carriers IMj. This may take place independent of the authorisation level OLi (also for different OLi of the authorisation authorities HAi, of the authorisation means AMi, of the applications Appi).

FIG. 9 in analogy to FIG. 8 illustrates several authorisation authorities HA and authorisation means AM for applications Appi, wherein, however, the initialisation to the authorised read and write stations A-WR takes place through several network levels N1, N2. The network levels N1 and N2 can be formed in the same or also in different networks. The application App1 with I-I1 of the authorisation authority HA1 here goes through the network level N1 into the authorisation authority HA2 and unchanged further through the network level N2 into the authorised read and write station. The application App2 at the authorisation authority HA2 is only conducted through the network level N2. This too, is independent of the authorisation level OLi.

FIG. 10 depicts a further example similar to FIG. 9 with several authorisation authorities, applications and network levels, wherein here two applications are illustrated on different authorisation levels, such as, e.g., the application App1 on OLn and the application App2 on OLn+1. This example with the application App1 of the authorisation authority HA1 illustrates, that it can also be supplemented to I-I1+ in the authorisation authority HA2, so that the corresponding application in the data carrier IMj corresponds to this application App1+.

In analogy to this modification or supplementing of an application in the authorisation authority, it is also possible to modify or to supplement initialisation information to I-I+ in accordance with FIG. 4 in a read and write station A-WR.

FIG. 11 schematically illustrates the organisation within an authorisation system A with several authorisation—, resp., organisation levels, e.g., OLi=OL0 to OL5, with several authorisation authorities HA on different authorisation levels and with several independent users HA1, HA2, HA3 with the independent applications App1, App2, App3. The highest organisation level OL0 corresponds to the level, on which a basic initialisation of all read and write stations and of all data carriers IM (e.g., through the system data field CDF) takes place in the meaning of an affiliation with the authorisation system A through different authorisation authorities HAi0 or authorisation authorities HAi0.1 assigned to these. The authorisation rules of the system assure the independence and mutual non-influenceability of the independent applications App1, App2, App3 of the corresponding independent users on organisation level OL1. As from the next authorisation level OL2 to OL5, e.g., an independent user is capable of organising and defining his applications within the framework of the authorisation system A with a secondary sub-authorisation system AS him- or herself. Also on these levels as from OL2, authorisation authorities HA can be formed with the corresponding authorisation means AM and between the various, geographically distributed authorisation authorities HA corresponding network connections and initialisations can be implemented through network levels, this in accordance with the rules explained.

With the authorisation system A in doing so it is ensured, that the applications of the various authorisation authorities are independent of one another and not mutually influenceable. An example with several independent applications in a data carrier is further illustrated in FIG. 13. In it, above all also contact-less and passive identification media, resp., data carriers are able to be utilised, which are also capable of communicating with a read and write station from a distance, e.g., at entrance gates.

In accordance with the invention different kinds of initialisations and ones with correspondingly differing security requirements are capable of being implemented in the authorisation system A. FIG. 12 in this context illustrates an example of a high hierarchic level and security requirement, in the case of which an empty mobile data carrier prepared in correspondence with the system is newly initialised with applications. This data carrier IM in doing so is prepared through system data of the authorisation system A in a system data field CDF, which defines and assures the affiliation with system A, which however, does not yet contain any application in an application data field prepared for this purpose. The new initialisation DI with the new initialisation information I-I of applications App in this application data field represents a first upper initialisation level.

FIG. 13 illustrates the initialisation of additional new applications, here, e.g., of the application App3, with initialisation data DI3 of an authorisation authority HA3.

As a further example, FIG. 13 illustrates the initialisation on an application extension App2.2 of an authorisation authority HA2 in addition to the existing application App2 by means of corresponding initialisation data DI2.2. This—on the basis of the following example mountain restaurant—is illustrated for the data carrier of FIG. 13 with a data organisation in a data carrier IM with several independent applications App1, App2, App3 and with a fixed data part CDF corresponding to the authorisation system A. The application App1 shall be, e.g., ski-lifts, the application App2 the mountain restaurant, which would like to introduce a further extension of its application App2.2 and which with a corresponding initialisation DI2.2 is able to inscribe this onto an already existing ski-pass, resp., data carrier IM of a guest directly on the spot in the mountain restaurant via its read and write station A-WR through the network—without the guest for this purpose having to go down into the valley to an authorised read and write station (of the issuer of the ski-pass as application App1) with authorisation medium, as was the case up until now.

As a further example, the same guest in the evening down in the valley with his ski-pass could have a further, independent application App3 newly initialised with initialisation data DI3 of the authorisation authority HA3, e.g., access to sports facilities, if this should not already be set-up on his data carrier.

FIG. 12 as a further variant of an embodiment illustrates a mobile data carrier, which comprises an applications microprocessor AppuP, which contains application program data I-I-Cod. With data carriers of this kind with integrated intelligence, combined applications are capable of being implemented, which in part are contained in the read and write station WR and in part in the data carrier IM and they make possible the handling of user authorisations ai (FIG. 14).

The initialisation according to the invention through a suitable secure network is capable of making possible new applications and business models, e.g., initialisation-linked business models through the utilisation of status information S-I, e.g.:

1. Licence fee debiting for newly initialised data carriers and newly initialised applications: With every initialisation of a new data carrier or of a new application in a data carrier IM, a correspondingly agreed licence fee is debited through the network at the authorisation authority HA.
2. Licence fee debiting for every usage: If an application is made use of by a data carrier at a read and write station, then for this usage a licence fee can be levied by the authorisation authority HA (e.g., a host H).

This may either be continuously settled, if the read and write station WR remains permanently connected with the authorisation authority HA on-line through the network, or else the connection through the network may take place periodically. Then the usage data S-I can be stored in memory in the read and write station WR and periodically exchanged and settled with the authorisation authority HA.

The initialisation through the network in accordance with the invention and the communication associated with it therefore depending on the application can take place both with a permanent network connection or also only periodically. In this, for example, applications with a validity limited in time can be renewed time and again by means of corresponding periodic initialisations (e.g., monthly).

FIG. 14 illustrates different variants of possible initialisations through a network, wherein the initialisations also comprise an initialisation communication, resp., a utilisation communication and/or an identification communication between authorisation authority HA, authorised read and write station A-WR and identification medium, resp., data carrier IM. An initialisation may originate with the authorisation authority HA or it also may be requested by the read and write station A-WR or by the owner of the data carrier IM. To do so, depending on the type of the new initialisation, resp., the application, also a user authorisation, i.e., the agreement of the owner 12 of the read and write station , resp., of the owner 13 of the data carrier is necessary, which as authorisation means may be, for example, personal data of the owner 12 of the read and write station (aw), resp., personal data (ai) of the owner 13 of the data carrier, such as PIN codes, biometric data, etc. The analogue is also applicable for the execution of applications at the read and write station by the data carrier. Depending on the type of authorisation and of its utilisation, therefore a user authorisation aw for the initialisation by the read and write station, resp., by its owner 12, or a user authorisation ai for the initialisation by the owner 13 of the data carrier may take place or also an authorisation for the initialisation by an additional identification authorisation means ID-AM may take place.

An example of an embodiment, e.g., is the loading of cash cards at a read and write station as card reading device. Here it is also possible for the owner of a cash card as data carrier to also load money with his authorisation, i.e., user authorisation ai (e.g., credit card number and PIN code) through a PC and the Internet.

With the method in accordance with the invention it is also possible to carry out multi-stage initialisations through networks, e.g., in several steps hierarchically graduated in correspondence with the authorisation A. This is illustrated by an example of decentralised manufacturing and distribution of chip-cards as data carriers with reference to FIG. 11. The owner of the authorisation system A in this instance is a manufacturer HA0 with main domicile and centre in Europe, where blank cards, resp., data carriers IM are produced, which, for example, contain the basic system organisation with the data field CDF. These blank cards through a network are sent to daughter companies HA0.1 as company representatives, e.g., in the USA, where a further basic initialisation of the cards can also be carried out by the manufacturer's centre HA0 as the highest authority. The daughter company HA0.1 distributes these cards to independent users with independent applications, which represent the authorities HA1, HA2, HA3 and the cards of which are differentiated between by a user code, which is capable of being initialised through the network at the daughter company HA0.1 by the centre HA0, if the daughter HA0.1 is not authorised to do so. HA0 and HA0.1 are on level OL0. This results in the following initialisation levels

HA0->HA0.1->HA1

On a next level of the hierarchy, thereupon these cards FM are initialised by the authorisation authorities HA1, HA2, HA3 (i.e., the independent users) with their required applications App1, App2, App3 through further organisation levels, once again at decentralised read and write stations A-WR. By means of initialisation—and authorisation rules and hierarchic graduations of the system A it is assured, that the owner HA0 of the authorisation system A is able to maintain the control over the system compatibility of the cards and for an independent user HA1, HA2 etc., that he keeps the control over cards with his applications within the framework of his authority as from the organisation level assigned (e.g., OL1). This results in further initialisation levels, e.g.,

HA1->HA1.1->HA1.11->A-WR/IM on organisation levels OL1 up to OL.n.

The independent users HA1, HA2, HA3, etc., with the independent applications are also on the organisation level OL1.

With the examples and explanations indicated, the universal applicability of the new method according to the invention is to be illustrated above all also for contact-less systems and identification media.

Within the scope of this description, the following designations are utilised:

N Network
No Public network
Np Private network
G1, G2 Security gates for a secure communication through the network
g Secure environment
u Unsecured environment
IM Mobile data carrier, identification medium
IMj Initialised IM
WR Decentralised read and write station
WRk Initialised WR
j relates to IM
k relates to WR
A-WR Decentrally authorised read and write station
A Authorisation system
AS Secondary sub-authorisation system
AM Authorisation means
AM-IM Authorisation identification media
AM-I Authorisation data
HA Authorisation authority, remote
H Host computer
R-A-WR Remote authorisation read and write station
DI Initialisation data A-I Authorisation information
A-I-FA Authorisation data for the function A-WR
I-I Initialisation information
I-I-Cod Applications program data
ID-AM Identification authorisation means
ID-I Identification information
S-I Status information
OLi Authorisation level, organization level
App Applications
AppuP Applications micro-processor
CDF Common data field, basic organization of A
ADF Application data field
12 Owner of WR
13 Owner of IM
aw User authorisation of WR
ai User authorisation of IM
H0 System owner
H0. Daughter company of H0

The invention claimed is:

1. A method for the secure initialization of mobile data carriers (IM) within the frame of an authorization system (A), comprising the steps of:
   generating initialization data (DI) in an authorization process in a secure environment (g) at a remote authorization authority (HA) by means of authorization means (AM)

said initialization data (DI) comprising authorization information (A-I) and initialization information (I-I) and being application-specific or system-specific, sending said initialization data (DI) over a network (N) in a secure communication according to security rules corresponding to the authorization system (A)

to a decentralized authorized read and write station (A-WR) in an unsecured environment (u), and using said initialization data (DI) at said decentralized authorized read and write station (A-WR) to initialize a new mobile data carrier (IMj), a new application (App3) or an extension of an application (App2.2).

2. The method according to claim 1, further characterized by using special authorization identification media (AM-IM) or authorization data (AM-I) as authorization means (AM).

3. The method according to claim 1, further characterized by initializing new independent applications (App3) with said initialization data.

4. The method according to claim 1, further characterized by initializing new applications (App) in a blank mobile data carrier which is prepared with a system data field (CDF) with said initialization data (DI).

5. The method according to claim 1, further characterized by establishing a connection between said authorization authority (HA) and said decentralized read and write stations (A-WR, WR) over the network (N) only occasionally and when an exchange of data takes place.

6. The method according to claim 1, wherein for said initialization an additional user authorization (aw) is effected by the read and write station (A-WR, WR), or by its owner (12) or an additional identification authorization means (ID-AM) is used.

7. The method according to claim 1, wherein for said initialization an additional user authorization (ai) by the data carrier or by the owner (13) of the data carrier is carried out.

8. The method according to claim 1, further characterized by using personal data (aw) of the owner of the read and write station or personal data (ai) of the owner of the data carrier, as authorization means for the authorization of initializations over the network (N), as well as for the execution of applications at the read and write station A-WR, WR).

9. The method according to claim 1, further characterized by using mobile data carriers (IM) comprising an application micro-processor (AppuP) for the processing of application program data (I-I-Cod).

10. The method according to claim 1, further characterized by using data carriers (IM) which are designed as contactless, active or passive identification media.

11. The method according to claim 1, further characterized by sending status informations (S-I) concerning events at the authorized, or at the decentralized read and write stations (A-WR, WR) and/or at the mobile data carriers (IM) to a corresponding authorization authority (HA) over the network (N).

12. The method according to claim 11, further characterized by using said status informations (S-I) for usage or license fee debiting.

13. A mobile data carrier (IMj) for the communication with assigned decentralized read and write stations (WR, WRk) in an unsecured environment (u) within the frame of an authorization system (A), said mobile data carrier being affiliated to said authorization system (A) by a basic system preparation and comprising a memory (CDF, ADF) with initialization data (DI), comprising authorization information (A-I) and initialization information (I-I), which are application-specific or system-specific, wherein said initialization data (DI) were generated in an authorization process in a secure environment (g) at a remote authorization authority (HA) by means of authorization means (AM)

and said initialization data were sent over a network (N) in a secure communication according to security rules corresponding to the authorization system (A)

to a decentralized authorized read and write station (A-WR) in an unsecured environment (u)

and where the mobile data carrier was initialized (IMj) with said initialization data (DI) by said decentralized authorized read and write station (A-WR).

14. A decentralized read and write station (WRk) in an unsecured environment (u) for the communication with assigned mobile data carriers (IM, IMj) within the frame of an authorization system (A), said read and write station being affiliated to said authorization system (A) by a basic system preparation and comprising a memory with initialization data (DI) comprising authorization information (A-I) and initialization information (I-I)

which are application-specific or system-specific, wherein said initialization data (DI) were generated in an authorization process in a secure environment (g) at a remote authorization authority (HA) by means of authorization means (AM)

and said initialization data were sent over a network (N) in a secure communication according to security rules corresponding to the authorization system (A)

to the decentralized read and write station (WR) in an unsecured environment (u)

and by means of said initialization data (DI) the decentralized read and write station was initialized (WRk) with a new application (App3) or an extension of an application (App2.2).

15. A method for the secure initialization of decentralized read and write stations (WR) within the frame of an authorization system (A), comprising the steps of:

generating initialization data (DI) in an authorization process in a secure environment (g) at a remote authorization authority (HA) by means of authorization means (AM)

said initialization data (DI) comprising authorization information (A-I) and initialization information (I-I) and being application-specific or system-specific, sending said initialization data (DI) over a network (N) in a secure communication according to security rules corresponding to the authorization system (A)

to a decentralized read and write station (WR) in an unsecured environment (u), using said initialization data (DI) to initialize said decentralized read and write station (WRk) with a new application (App3) or an extension of an application (App2.2).

16. The method according to claim 15, further characterized by using special authorization identification media (AM-IM) or authorization data (AM-I) as authorization means (AM).

17. The method according to claim 15, further characterized by transforming a (non-authorized) decentralized read and write station (WR) into an authorized read and write station (A-WR) by means of function authorization data (A-I-FA) which are contained in the initialization data (DI), and subsequently initializing mobile data carriers (IM) in correspondence with the initialization data.

18. The method according to claim 15, further characterized by establishing a connection between said authorization authority (HA) and said decentralized read and write stations (A-WR, WR) over the network (N) only occasionally and when an exchange of data takes place.

19. The method according to claim 15, wherein for said initialization an additional user authorization (aw) is effected by the read and write station (A-WR, WR), or by its owner (12) or an additional identification authorization means (ID-AM) is used.

20. The method according to claim 15, further characterized by using personal data (aw) of the owner of the read and write station or personal data (ai) of the owner of the data carrier, as authorization means for the authorization of initializations over the network (N), as well as for the execution of applications at the read and write station (A-WR, WR).

21. The method according to claim 15, further characterized by using data carriers (IM) which are designed as contact-less, active or passive identification media.

22. The method according to claim 15, further characterized by sending status informations (S-I) concerning events at the authorized, or at the decentralized read and write stations (A-WR, WR) and/or at the mobile data carriers (IM) to a corresponding authorization authority (HA) over the network (N).

23. The method according to claim 22, further characterized by using said status informations (S-I) for usage or license fee debiting.

* * * * *

UNITED STATES PATENT AND TRADEMARK OFFICE
CERTIFICATE OF CORRECTION

PATENT NO.        : 7,631,187 B2                                                  Page 1 of 1
APPLICATION NO. : 10/070786
DATED             : December 8, 2009
INVENTOR(S)       : Klosa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1013 days.

Signed and Sealed this

Second Day of November, 2010

David J. Kappos
*Director of the United States Patent and Trademark Office*